Oct. 23, 1945.  F. C. HILBERG  2,387,512

LUMINESCENT ADHESIVE TAPE

Filed Feb. 10, 1942

Frank C. Hilberg  INVENTOR

Patented Oct. 23, 1945

2,387,512

UNITED STATES PATENT OFFICE 2,387,512

LUMINESCENT ADHESIVE TAPE

Frank C. Hilberg, Wilmington, Del., assignor to E. I. du Pont de Nemours & Company, Wilmington, Del., a corporation of Delaware Application February 10, 1942, Serial No. 430,263

3 Claims. (Cl. 250—71)

This invention relates to an adhesive tape and more particularly to a luminescent adhesive tape which may be stuck to doorways, entrances, stairways, and smaller objects for identification in the dark.

Heretofore it has been known that certain salts, particularly those of radium and the sulphides of the alkaline earth metals, have the property of absorbing light from the sun or from a source of artificial light of suitable wave length rendering them phosphorescent for a considerable time when placed in the dark. After the phosphorescence has been lost, it may be restored again by exposing the salt to light, either artificial or natural.

The sulphides used to produce the luminescent coating are usually water-soluble and when exposed to rain or fog this property is lost. It has previously been proposed to use certain binders for adhering the luminescent pigment to a surface and to decrease hydrolysis of the sulphides but in many cases the efficiency of the phosphorescence is greatly impaired.

It is therefore an object of this invention to provide a simple means for rendering certain areas luminescent during blackouts or other emergencies.

A further object of this invention is to provide an adhesive tape which is provided with a layer of luminescent pigment which is protected from the atmosphere by a transparent film which does not interfere with the activation of the luminescent pigment on exposure to light.

Other objects will appear as the description of the invention proceeds.

The foregoing objects are accomplished by coating a transparent film with a pressure-sensitive adhesive composition having the luminescent pigment dispersed therein or having the luminescent pigment between two layers of the adhesive, as will be described in detail hereinafter.

It has been found that regenerated cellulose is particularly satisfactory as a transparent base for carrying the luminescent pigment and the adhesive. The regenerated cellulose may be prepared from viscose or from a cuprammonium cellulose solution by methods well-known in the art. In addition to regenerated cellulose, other transparent films, such as those prepared from hydrogenated rubber, chlorinated rubber, polyvinyl alcohol, polyvinyl acetal, cellulose acetate and certain resins which may be formed into thin flexible transparent pellicles, provided they do not react with the luminescent pigment or the pressure-sensitive adhesive.

Figure 1:
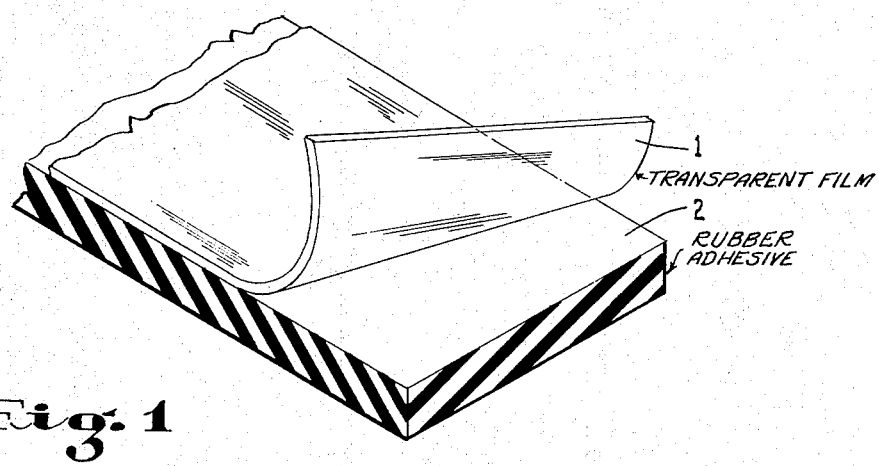
Figure 2:
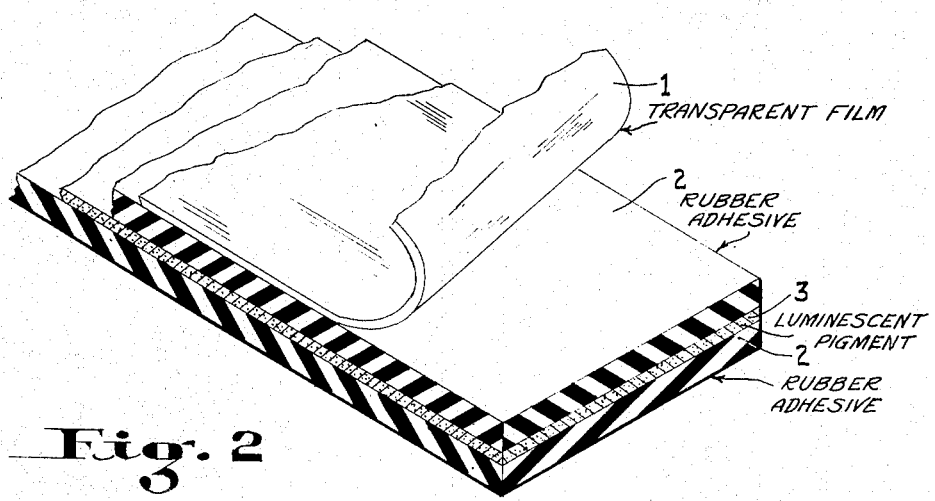

In the drawing, Figure 1 is a diagrammatic section of the luminescent tape produced according to the present invention. Figure 2 is likewise a diagrammatic section showing a modification in which the luminescent pigment is applied between coats of a transparent pressure-sensitive adhesive. In both figures, 1 represents a transparent sheet, such as regenerated cellulose or one of those enumerated above. The adhesive applied to one side thereof is shown as 2. In Figure 1, this adhesive layer has the luminescent pigment incorporated therein. In Figure 2, the adhesive is usually a clear cement applied directly to the transparent layer or applied to the layer which was previously provided with a primer to enhance adhesion between the adhesive and the regenerated cellulose or similar film. The luminescent pigment coat is then applied over the first layer of adhesive 2. The luminescent pigment layer is shown as 3. Subsequently another adhesive coat shown as 2 is applied. This does not necessarily have to be clear.

The cement used may be any suitable pressure-sensitive adhesive which will adhere to the selected base. It is preferred however to use a primer between the adhesive and the regenerated cellulose layer so that when the material is wound in a roll, the adhesive does not lift or adhere to the wrong side of the regenerated cellulose. This tendency may also be eliminated by applying a material to the base of the regenerated cellulose which decreases adhesion of the adhesive thereto. Many methods are well-known in the art for accomplishing this purpose, for example, those disclosed in U. S. Patent 2,177,627 to Drew, issued October 31, 1939. It has also been found that a thin film of certain resins or nitrocellulose on the side of the regenerated cellulose to which the adhesive is subsequently applied may be used, as disclosed in U. S. Patent 2,192,708 to Hershberger, issued March 5, 1940. If the material is to be used in a damp atmosphere, the regenerated cellulose should be water-proofed by means well-known in the art. When the tape is not to be packaged in rolls, the intermediate anchoring coat while desirable is not essential.

Example I

A clear sheet of cellulose acetate film was coated on one side with a composition having approximately the following formula:

| | Parts by weight |
|---|---|
| Pale crepe rubber | 1.0 |
| Solvent | 0.5 |
| "Stabilite" resin [1] | 1.0 |
| Calcium sulphide base luminescent pigment | 1.0 |

---

[1] The "Stabilite" resin used in this example is a very pale resin which is a hydrogenated rosin composition and is sold by the Hercules Powder Company.

The above ingredients were mixed until the pigment was uniformly dispersed throughout the mass. It was subsequently applied in the form of a thin film to the acetate base. The coated sheet was then placed in the light and after sufficient time elapsed to be sure of its activation, it was placed in the dark and found to be relatively bright.

Rosin may be used in this example in place of the "Stabilite" resin.

Example II

A film of wet-proof regenerated cellulose having a pressure-sensitive rubber adhesive on one side thereof and sold as "Scotch" cellulose tape, was dusted liberally with a layer of a luminescent pigment, a heavy film of which adhered to the rubber adhesive. Subsequently a similar film of the rubber adhesive was applied over the luminescent pigment layer. The finished material was then exposed to the light which passed through the regenerated cellulose and the layer of rubber adhesive to the luminescent pigment and after it was activated it was placed in the dark and gave a relatively strong phosphorescence. This material may be applied and removed from the surface rapidly without lifting or without any apparent deleterious effect to its phosphorescent property.

The rubber adhesive may be applied with a knife or roller coated or any other means known in the art.

The preferred luminescent pigment is calcium sulphide although the sulphides of barium and strontium are suitable. Zinc and cadmium sulphides are also very suitable. As is well known in the art, the pure alkaline earth sulphides do not phosphoresce but are dependent on the presence of some foreign substance, usually minute traces of other elements, such as bismuth, cadmium, manganese, zinc, etc. which modify the color of the phosphorescent glow. The nitrates of uranium and thorium may be added to barium and strontium compounds for special tints although these do not have as much effect on calcium sulphide as on strontium and barium sulphides. Metal oxides which yield a characteristic flame test as a rule give the same tint to the luminescent pigment. The following are examples of methods of preparing luminescent pigments suitable for incorporation in the vehicle which is subsequently applied to the tape. Group II metals of the periodic arrangement having a molecular weight greater than magnesium in general are suitable.

| | Parts by weight |
|---|---|
| Zinc carbonate | 100.00 |
| Sulphur | 100.00 |
| Potassium chloride | 0.5 |
| Sodium chloride | 0.5 |
| Manganese chloride | 0.4 |

This material gives a violet luminescence.

| | |
|---|---|
| Cadmium carbonate | 100.00 |
| Sulphur | 30.00 |
| Sodium carbonate | 2.00 |
| Sodium chloride | 0.5 |
| Manganese sulphate | 0.2 |

This material gives a deep yellow phosphorescence.

| | |
|---|---|
| Strontium thiosulphate | 60.00 |
| Bismuth nitrate | 0.1 |
| Uranium nitrate | 0.05 |

This material gives an emerald green phosphorescence.

| | |
|---|---|
| Calcium oxide | 20.00 |
| Sulphur | 6.00 |
| Starch | 2.00 |
| Bismuth nitrate | 0.008 |
| Potassium chloride | 0.15 |
| Sodium chloride | 0.15 |

This material gives a violet phosphorescence.

The materials in each of the above examples are heated to about 1300° C. after which they are allowed to cool and are ground. These are then ready for incorporation in the coating composition or used as otherwise described in this application. Other metallic oxides may be used to give the phosphorescence the characteristic tint of the metal.

In the preferred embodiment the pressure-sensitive adhesive employs a pale crepe rubber as the film-forming material. Synthetic resins suitably plasticized to produce a pressure-sensitive adhesive film and which are sufficiently transparent in the form of thin films may also be satisfactorily used. Particularly polyvinyl butyraldehyde resins, polymeric esters of methacrylic acid, and certain other polyvinyl resins are useful in this connection. The film-forming material should not have any reaction with the luminescent pigment which might destroy its ability to glow in the dark after being activated.

It is to be mentioned that small portions of non-luminescent pigments such as, e. g. titanium dioxide, zinc oxide, cadmium reds, aluminum powder, ultramarine blue, etc. may be blended with the luminescent pigments to obtain various color effects. The use of pigments containing large proportion of iron should be avoided since they have a deleterious effect on the luminosity. Further materials containing copper and manganese should be avoided since they attack the rubber adhesive mass.

In the preferred embodiment of the invention phosphorescent pigments which glow after an exciting light source has been removed are mentioned. However, fluorescent materials which only glow while being excited by light of suitable wave length may also be used.

The primary advantages of the present invention is that the tape so-made may be readily applied to such places as stairways, airplane hangar boundaries, companion ways on shipboard, edges of railway platforms, sidewalk curbs, etc. in an emergency which occurs during an air raid, when there is insufficient time to apply the conventional paint compositions containing the luminescent pigment. The luminescent pigment composition prepared according to the present invention remains active for about 24 hours and after a few minutes exposure to sunlight or suitable artificial light is again activated for a similar period. Tape, such as herein disclosed, is particularly useful for identifying objects in the dark during a blackout.

By the term "luminescent" as used throughout the foregoing specification and in the appended claims is meant that property of a material which causes visible light rays to be emitted after an exciting light source has been removed, as well as that property of a material to glow under a source of light of low visibility and suitable wave length as an exciting source.

It is apparent that many widely different embodiments of this invention may be made without departing from the spirit and scope thereof, and therefore, it is not intended to be limited except as indicated in the appended claims.

I claim:

1. A phosphorescent tape comprising a transparent base having on one side thereof a thin, substantially transparent layer of rubber, a layer of luminescent pigment and another layer of rubber adhesive superposed over said pigment layer.

2. The article of claim 1 in which the transparent base is regenerated cellulose.

3. The article of claim 1 in which the transparent base is water-proofed regenerated cellulose.

FRANK C. HILBERG.